United States Patent [19]
Jenkins

[11] Patent Number: 5,212,669
[45] Date of Patent: May 18, 1993

[54] REMOTE CUT-OFF VALVE

[75] Inventor: Philip J. Jenkins, Pearland, Tex.

[73] Assignee: Western Atlas International, Inc., Houston, Tex.

[21] Appl. No.: 713,964

[22] Filed: Jun. 11, 1991

[51] Int. Cl.$^5$ .......................... G01V 1/04; G01V 1/38
[52] U.S. Cl. ..................................... 367/144; 181/120
[58] Field of Search ................. 367/23, 76, 144, 146; 181/118, 120

[56] References Cited

U.S. PATENT DOCUMENTS

| H435 | 2/1988 | Jenkins et al. | 367/144 |
|---|---|---|---|
| 4,211,300 | 7/1980 | Miller | 181/120 |
| 4,324,311 | 4/1982 | Farris | 181/120 |
| 4,525,813 | 6/1985 | Burrage | 367/20 |
| 4,599,712 | 7/1986 | Chelminski | 367/144 |
| 4,750,583 | 6/1988 | Wolf | 367/144 X |
| 4,757,482 | 7/1988 | Fioke, Jr. | 367/144 |
| 4,852,071 | 7/1989 | Otto | 367/144 |

Primary Examiner—Brian S. Steinberger
Attorney, Agent, or Firm—Paul S. Madan

[57] ABSTRACT

A control valve for use in geophysical surveying is disclosed. The valve contains a housing having a through bore intersecting with a fluid path. The fluid passes from an input port to an output port. A seat having recess thereof is placed in the fluid path in the through bore. A poppet assembly is attached to the through bore at the end opposite to the seat. The poppet assembly contains a poppet one end of which is adapted to match the recess and moveable in opposite directions by a motor. A decoder is coupled to the motor for causing the motor to turn in the desired direction. When the motor is turned in one direction, the poppet moves toward the seat and completely closes off the fluid path between the input and output ports. To open the valve, the motor is moved in the opposite directions to move the poppet away from the seat until the fluid path is open.

2 Claims, 3 Drawing Sheets

REMOTE CUT-OFF VALVE

BACKGROUND OF THE INVENTION

This invention relates generally to a valve and more particularly to a remote cut-off valve for use in geophysical surveying.

DISCUSSION OF THE RELATED ART

In marine seismic surveying, to obtain geophysical information relating to the substrata located below the sea bottom, air guns or gas guns are frequently used as acoustic transmitters to produce shock waves or pressure pulses. Usually, multiple air guns are placed in a spaced relationship to form an array. One or more than one array is pulled behind a vessel at a certain depth below the water surface. High pressure compressed air (usually between 1000-2000 psi) is used to operate the air guns. A common air supply line is used to supply the compressed air to all air guns in an array.

During operation, each air gun is fired every few seconds for several hours at a time. Due to the hostile conditions in which the guns have to operate and due to the high frequency of operation, the presently available air guns frequently fail. Once an air gun fails, an air leak path may develop from the supply line through the failed air gun to the surrounding water. If a common air supply line is used to supply a fluid to the air guns in an array, this will require stopping the entire operation to repair or replace the failed air gun. Stopping the work is generally very expensive (several thousand dollars per hour), and therefore, is not desirable. In some applications, the data obtained by utilizing less than all the air guns in an array is acceptable and therefore it may be much more desirable to continue to obtain the data by utilizing less than all the air guns. In certain other applications, it may be desirable to make a generic air gun array and operate only the desired air guns required for those applications. That would only be possible if means could be provided that will enable an operator to remotely cut-off (from the vessel) air supply only to the desired air guns without adversely affecting the air supply to the remaining air guns in that array.

The present invention provides a remotely operated cut-off valve for each air gun which terminates air supply from the common air supply line to any number of air guns in a subarray without adversely affecting air supply to the remaining air guns.

SUMMARY OF THE INVENTION

An air gun subarray contains a number of air guns placed in a spaced relationship. High pressure fluid is supplied to each air gun from a common air supply line. A valve is connected between the air supply line and each air gun. To activate or deactivate a particular air gun, a coded signal is sent to all the valves. A decoder decodes the signal and causes the desired valve to open or close accordingly.

The valve includes a housing having a fluid path therethrough between an input and output port. A poppet adapted to open or cut-off the fluid path between the ports is placed in the housing. A motor coupled to the poppet moves the poppet to open or close the valve. A decoder is coupled to the motor, which receives signals from a remote location and in response to the signals causes the motor to operate to move the poppet.

Examples of the more important features of this invention have been summarized rather broadly in order that the detailed description thereof that follows may be better understood, and in order that the contribution to the art may be better appreciated. There are, of course, additional features of the invention that will be described hereinafter and which will be the subject of the claims appended hereto.

BRIEF DESCRIPTION OF DRAWINGS

For detailed understanding of the present invention, references should be made to the following detailed description taken in conjunction with the following drawings in which like elements have been given like numerals.

DESCRIPTION OF THE PREFERRED EMBODIMENT

Figure 1:
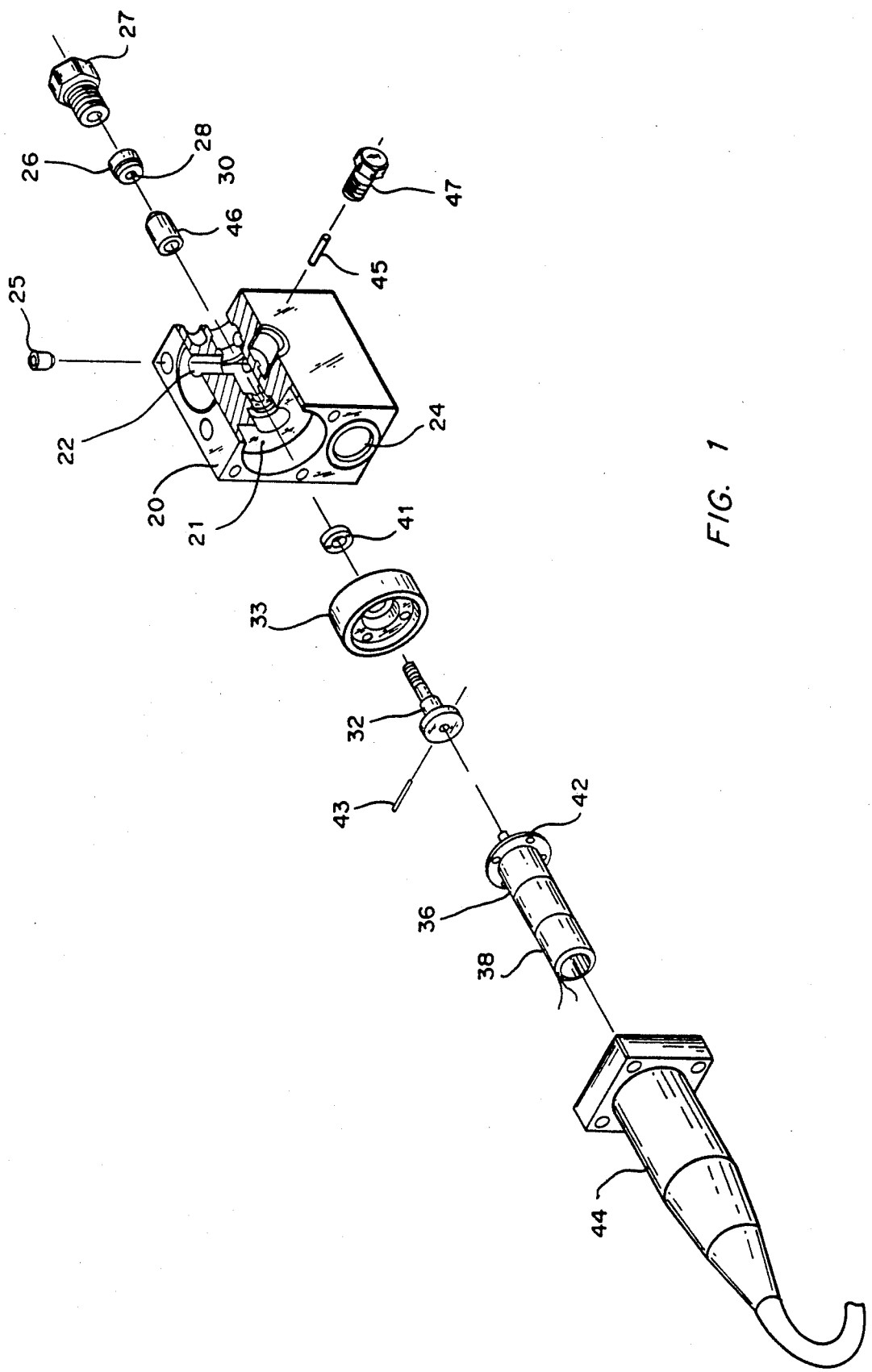
FIG. 1 shows, an isometric view, the parts of the valve placed along an x-axis.

FIG. 1 shows, in an isometric view, the components of the valve of the present invention placed along an x-axis. And FIG. 2 shows a partial cross-sectional view of the assembled valve when it is in a near closed or cut-off position.

Figure 2:
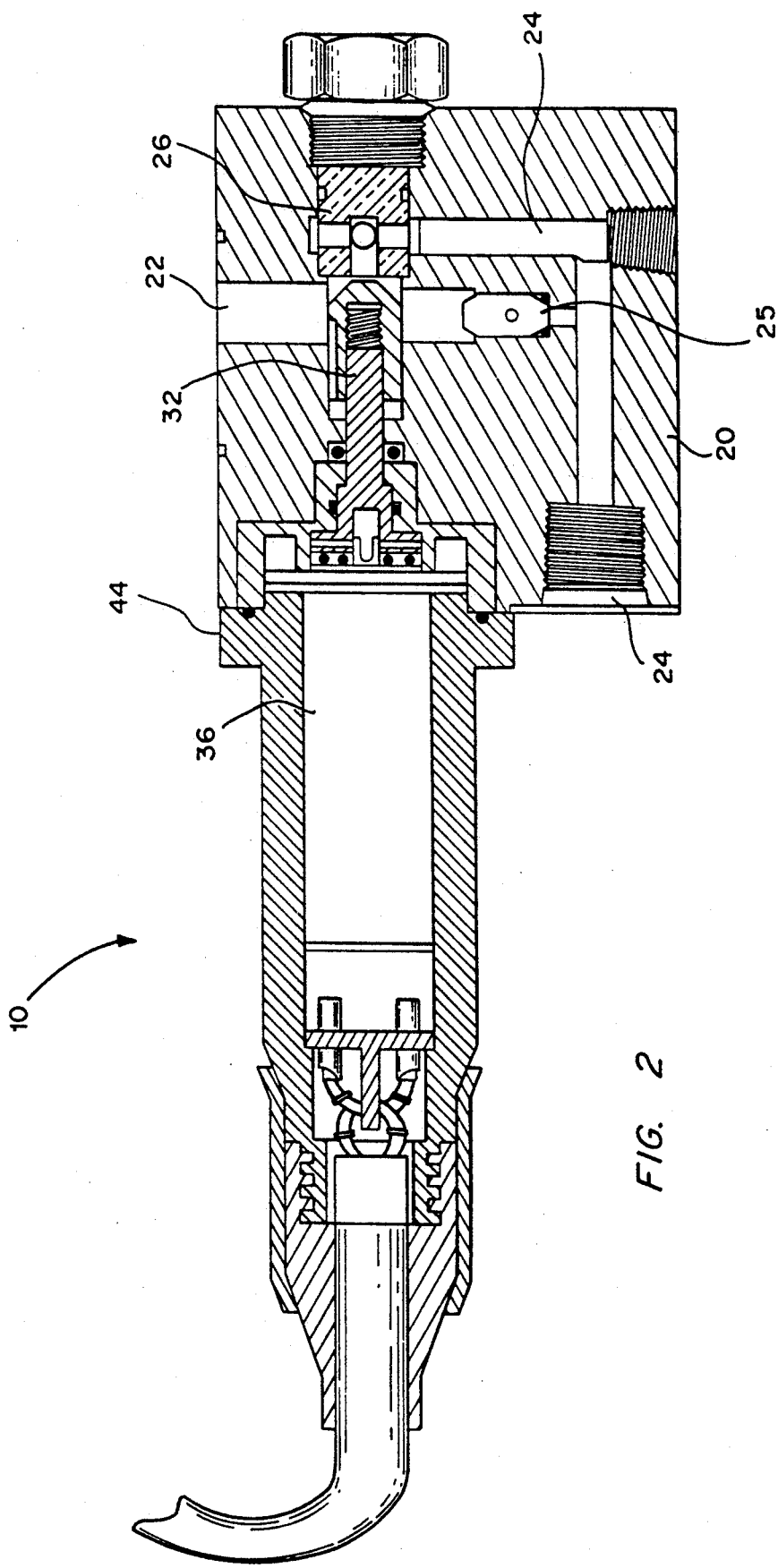
FIG. 2 shows a partial cross-sectional view of the assembled valve in a near closed position.

Referring to FIGS. 1 and 2, the valve 10 contains a body 20 which has a through bore 21 between two ends of the body. An input port 22 that intersects and passes beyond the bore 21 is formed in thw body 20. An output port 24 that is in fluid communication with the input port is formed in the body 20. The input port 22 is adapted to receive a high pressure (compressed) fluid (generally air or a mixture of air and a lubricant). When the valve is assembled and is in the open position, any fluid supplied to the input port flows substantially uninhibited through the body 20 and discharges at the output port 24.

A seat 26 containing a recess 28 is securely placed in the bore 21 so that the recess 28 aligns with the bore and terminates near the input port 22. A member 27 is attached to the body 20 to securely hold the seat in place in the bore 21. A poppet assembly, placed inside a body 44, is attached to the other end of the bore (the end opposite from the seat 26). The poppet assembly contains a poppet 30 whose one end is shaped to match the recess 28 of the seat 26 and the other end has a threaded hole adapted to accommodate a lead screw 32. The poppet has a slot 46 to accommodate a pin 45. The pin 45 and a plug 47 are installed in the body 20 to prevent the poppet from rotating within the body. A gear head 42 is attached to the lead screw 32 by a pin 43. A motor 36 is coupled to the gear head 42 for rotating the gear head and thus the lead screw 32. A decoder 38 is coupled to the motor 36 for receiving and decoding enciphered signals and for causing the motor to turn in clockwise or anti-clockwise directions in response to the received signals. A coupling 33 is placed inside the bore to align the poppet assembly and to-form a seal from any water intrusion. The coupling 33 captures a seal 41 between the coupling and the body 20 and around the lead screw 32 to prevent air from escaping from the motor end of the flow path through the body 20. The lead screw is screwed into the poppet 30. The subassembly made by the gear head 42 attached to the lead screw, the motor 36 attached to the gear head 42 and the decoder 38 coupled to the motor 36 is placed in a housing 44. The entire assembly is sealingly attached to the body 20 to seal the housing 44 from water intrusion.

When the motor turns in one direction, the lead screw advances the poppet toward the seat until the poppet mates with the seat recess 28 thereby completely blocking the fluid passage from the input port 22 to the output port 24. When the motor is turned in the opposite direction, the poppet recedes toward the motor until the fluid path from the input port to the output port is completely open. In operation, the operator sends an address and an open or a close signal to the decoder, which decodes the signal and causes the motor to turn to open or close the valve accordingly. A secondary fluid flow path is provide in the housing between the input port 22 and the output port 24. A one-way safety check valve 25 is sealingly placed in the housing 20 in the secondary flow path. The check valve automatically opens and enables the fluid to pass from the output port 24 to the input port 22 when the pressure at the output port exceeds the pressure at the input port 22 by a predetermined amount—by the threshold pressure value of the check valve.

In an alternate embodiment, a separate decoder 38 for each motor may be placed outside the housing 44 and electrically or operatively coupled to the motor or a common decoder may be used to control a number of motors. The decoder 38 contains an address decoder to decode addresses and a circuit to direct power to the addressed valves. The address signals may be in the form of digital signals, analog signals or in the form of some other addressing means.

Figure 3:
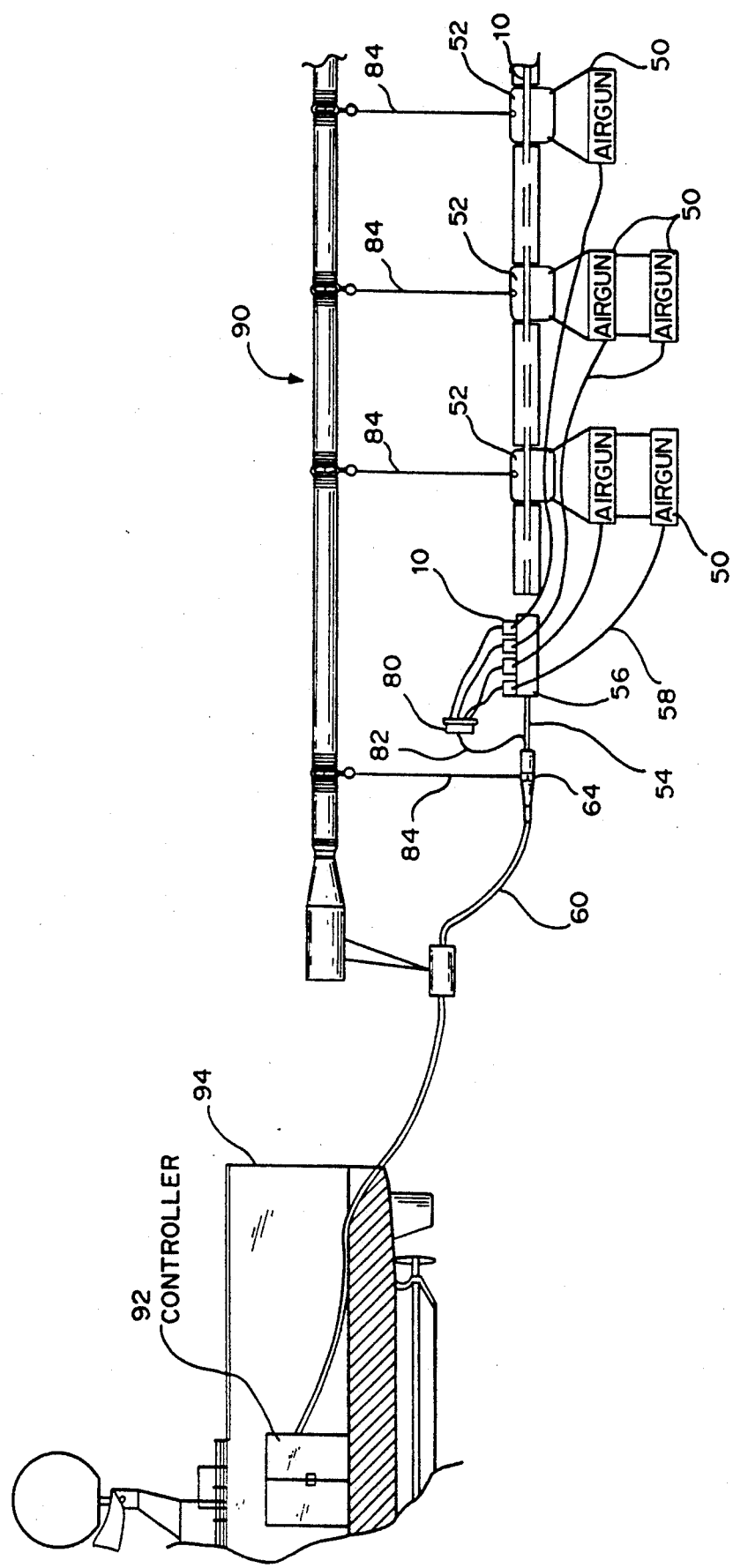
FIG. 3 shows an air gun subarray utilizing the valve of FIG. 1.

As noted earlier, several air guns are placed in a spaced relationship to form an array and generally more than one array is used at a time to perform geophysical surveying. FIGS. 3 shows an exemplary air gun array that include valves according to the present invention. Referring to FIG. 3, several air guns, each designated by a numeral 50, are suspended from frames 52. The entire array is pivotly suspended from a floatation device 90 by a plurality of parallel links 84. The array and the floatation device assembly is towed behind a vessel 94 to perform geophysical surveying. Compressed air is supplied to all of the air guns in the array via a common air supply line 54. Input port of each valve is connected to a manifold 56. The individual valves may be directly connected to the supply air line. The compressed air is supplied to the manifold from the vessel via a hose bundle 60. The output port of a separate valve is connected to a separate air gun. Alternatively, a single valve may also be connected to a set of air guns. A common decoder 80 is placed on or near the air gun array and coupled to each valve 10. Alternatively valves that contain individual decoders therein as shown in FIG. 1 may be used. The common decoder 80 receives control signals and power for the motors via a bus 82 and in response to the received signals causes the appropriate guns to activate or deactivate. The compressed air from the air supply line is supplied to the input port of each valve while a hose is connected to the output port which carries the compressed fluid to the air gun. In this manner each valve 10 is independently and remotely controlled. A hose bundle 60, which carries, among other things, the compressed fluid and the bus 82 is connected to the air gun array at a point 64. In the art of marine geophysical surveying, hose bundles, like the hose bundle 60, are commonly used to carry compressed fluid and electrical conductors to the air gun arrays. However, it is highly desirable to make the hose bundle as small as possible in order to minimize the drag. In order not substantially increase the hose bundle size, a single pair of conductors is used to carry both the power and address signals to the decoder from a remote controller 92 stationed on a vessel 94.

When a particular air gun fails or when it is otherwise desired to shut off a particular air gun, a coded close signal for that air gun is sent to all the control valves. The decoder 80 decodes the signal and causes the desired valve to close, thereby shutting off its associated air gun. Similarly, when it is desired to operate the air gun, a coded open signal is sent to the valve to open it. At the termination of the operation, the air supply to the hose bundle is cut off from the controller 92 which reduces the pressure at the input port of each valve to a relatively low level (near atmospheric pressure). If the pressure in any of the air guns is greater than the pressure at the input port of its corresponding valve by the threshold pressure value of the one way safety check valve, the safety check valve 25 for that valve (see FIG. 1) will open and bleed off the high pressure fluid from the air gun to the supply air line, which is an important safety consideration.

The foregoing description has been directed to a particular embodiment of the invention for the purposes of illustration and explanation. It will be apparent, however, to those skilled in the art that many modifications and changes to the embodiment set forth here will be possible without departing from the scope and spirit of the invention. It is intended that the following claims be interpreted to embrace all such modifications and changes.

What is claimed is:

1. An air gun array for use in geophysical surveying, comprising:
   (a) a plurality of air guns placed in a spaced relationship;
   (b) a fluid supply line for supplying a fluid to each said air gun; and
   (c) a remote controlled valve coupled to the fluid supply line and each said air gun, said remote controlled valve further comprising:
      (i) a body having a bore therethrough;
      (ii) an input port formed in the body, said input port coupled to the fluid supply line for receiving the fluid therefrom;
      (iii) an output port formed in the body, said output port having a sealable recess terminating in the bore, said output port coupled to an associated air gun for supplying the fluid to that air gun, said input and output ports being in fluid communication with each other and with the bore when the recess is open;
      (iv) a poppet paced in the bore, said poppet adapted to move in the bore between an open and a close position, said poppet having a free end adapted to seal the output port recess when the free end is placed in the output port recess, the close position being defined when the poppet seals the recess;
      (v) a motor coupled to said poppet for moving the poppet between the open and close positions; and
      (vi) a decoder coupled to said motor, said decoder adapted to receive signals and in response thereto causing the motor to turn so as to move the poppet between the open and close positions.

2. An air gun array, comprising:
(a) a plurality of air guns placed in a spaced relationship;
(b) a single fluid supply line for supplying a fluid to the air guns;
(c) a hose bundle coupled to the fluid supply line, said hose bundle carrying a compressed fluid therethrough and an electrical conductor for carrying address signals and power;
(d) a remotely operated valve placed near the array and connected between the hose bundle and each said air gun for supplying a compressed fluid from the hose bundle to the air guns, each said valve further comprising:
(i) a body having a bore therethrough;
(ii) an input port formed in the body, said input port coupled to the fluid supply line for receiving the fluid therefrom;
(iii) an output port formed in the body, said output port having a sealable recess terminating in the bore, said output port also coupled to an associated air gun for supplying the fluid to that air gun, said input and output ports being in fluid communication with each other and with the bore;
(iv) a poppet paced in the bore, said poppet adapted to move in the bore between an open and a close position, said poppet having a free end adapted to seal the output port recess when the free end is placed in the output port recess, the close position being defined when the poppet seals the recess;
(v) a motor coupled to said poppet for moving the poppet between the open and close positions; and
(vi) a one way relief valve having a preset threshold pressure coupled between the bore and the output port, said relief valve opening to provide fluid communication between the bore and the output port when the pressure in the output port exceeds the pressure in the bore by the threshold amount; and
(vii) a decoder coupled to said motor and the conductor, said decoder adapted to receive addresses for the air guns and power and in response thereto causing the motor to turn so as to move the poppet between the open and close positions.

* * * * *